United States Patent [19]
Lee

[11] 3,811,094
[45] May 14, 1974

[54] BIO-ISOLATED DC OPERATIONAL AMPLIFIER

[75] Inventor: Robert D. Lee, San Mateo, Calif.

[73] Assignee: The United States of America as represented by the Administration of the National Aeronautics and Space Administration, Washington, D.C.

[22] Filed: June 30, 1972

[21] Appl. No.: 267,862

[52] U.S. Cl. .................................. 330/59, 330/28
[51] Int. Cl. ........................................... H03f 17/00
[58] Field of Search .................... 330/59; 250/217 S

[56] References Cited
UNITED STATES PATENTS
3,699,468  10/1972  Harmgardt ...................... 330/59 X
2,904,696   9/1959  Elliot et al. ......................... 250/213
1,855,863   4/1932  McCreary ........................... 330/59

Primary Examiner—Nathan Kaufman
Attorney, Agent, or Firm—Darrell G. Brekke; Armand G. Morin, Sr.; John R. Manning

[57] ABSTRACT

A bio-isolated DC operational amplifier is provided for use in making bio-electrical measurements of a patient while providing isolation of the patient from electrical shocks and the like, the circuit comprising a first operational amplifier coupled to the patient and having its output coupled in a forward loop through a first optic coupler to a second operational amplifier, the output of the second operational amplifier being coupled to suitable monitoring circuitry. The output of the second operational amplifier is coupled via a feedback circuit including a second optic coupler to the input of the first operational amplifier.

5 Claims, 1 Drawing Figure

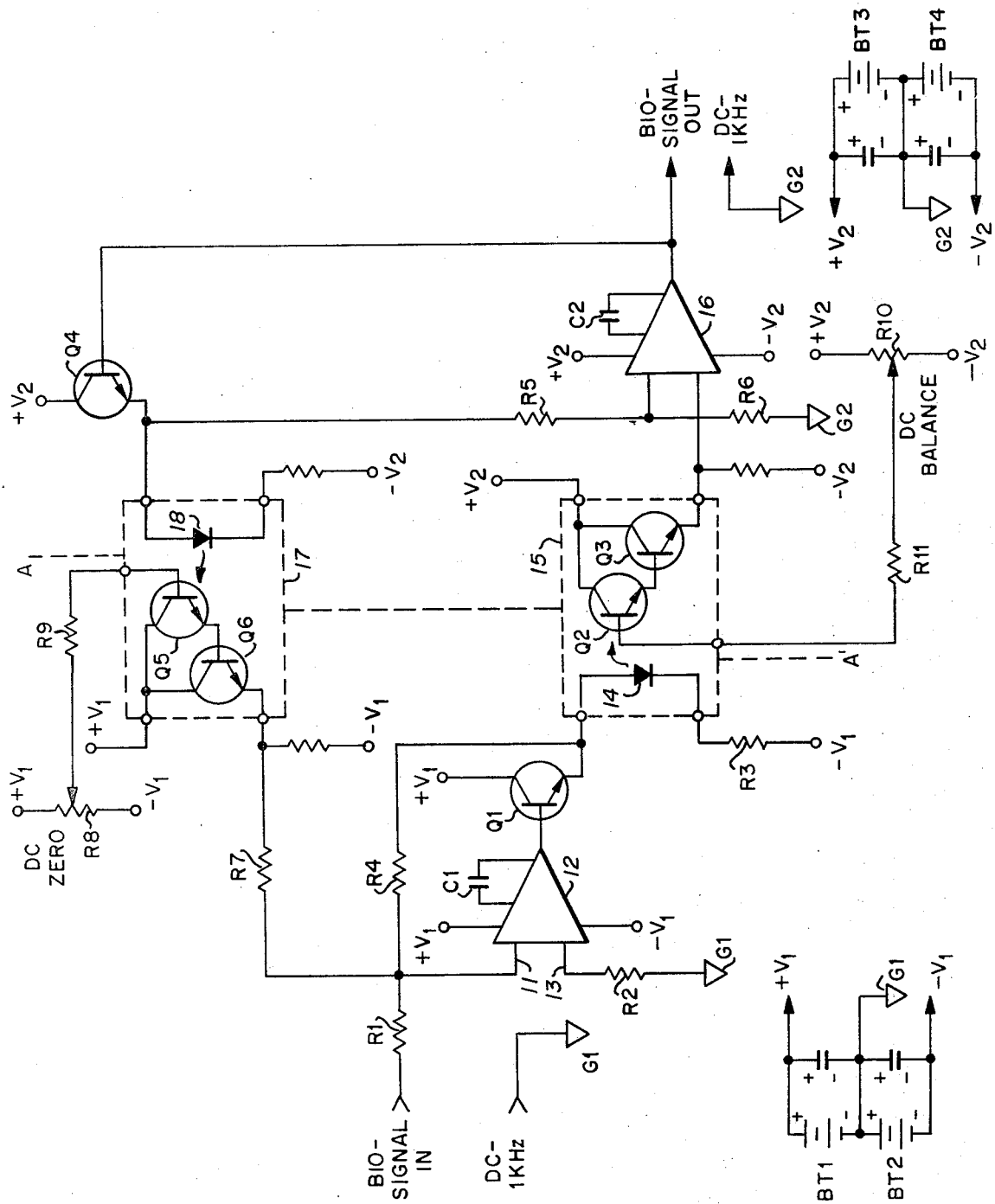

BIO-ISOLATED DC OPERATIONAL AMPLIFIER

The invention described herein was made by an employee of the United States Government and may be manufactured and used by or for the Government for governmental purposes without the payment of any royalties thereon or therefor.

BACKGROUND OF THE INVENTION

Biomedical instrumentation is widely used in hospitals and medical clinics for bio-electrical measurements such as ECG, EEG and EMG and for providing electrical analog signal outputs indicative of organ dimensions and the like. Sensors or transducers attached to the patient provide inputs to the electrical instrumentation where the information signals which are in the form of DC levels or low frequency AC, e.g. up to 1,000 Hz, are amplified and converted to suitable read-outs. Such known instruments provide a substantial hazard to the patient; for example an electrical shock to a catherized patient produced by ground leakage current of 20 μamp can cause ventricular fibrillation which can be fatal unless terminated within a short time. The current path for the leakage generally involves the patient ground traditionally coupled to a local electrical power line or to earth ground. It is very desirable, therefore, to isolate the patient from this source of electrical current.

Certain techniques have been proposed to provide this isolation, including instruments wherein the amplifiers are DC isolated by employing transformer isolation in a DC-to-DC converter consisting of an input preamplifier driving a low level modulator-transformer or a light coupler-demodulator at a given frequency. The systems use either amplitude modulation or frequency modulation techniques for transmitting the DC information. The isolation occurs at a low level and the DC input signals are restored at the demodulator output. Such systems have undesirable features or characteristics including special shielded transformers to limit stray leakage capacitance to 95 picofarad or less, questionable reliability with complex modulating-demodulating techniques, electrical noise typically limiting system accuracy to 5 percent, and excess power for FM light-pipe-coupled open loop systems.

SUMMARY OF THE PRESENT INVENTION

The present invention provides a simple stable bio-isolated DC amplifier system for monitoring bio-electrical and physical activities of a patient wherein the patient is isolated from the power line or earth ground. The amplifier is capable of directly isolating DC and AC and amplifying the same with the superior operating characteristics typical of a simple directly connected operational amplifier.

A first operational amplifier receives at its input the incoming bio-signal from the patient, e.g. ECG, EEG, EMG or analog voltage in an instrument monitoring organ dimension, the output of the operational amplifier being coupled to the light emitter of a first optic coupler. The photodetector of the optic coupler is coupled to the input of a second operational amplifier, the output of this second amplifier being transmitted to subsequent stages or read-outs. A feedback circuit is coupled from the output of the second amplifier to the input of the first operational amplifier, the feedback circuit comprising a second optic coupler. The first operational amplifier and associated circuitry is provided with a separate battery power supply.

Thus the first operational amplifier circuitry coupled to the patient is electrically isolated from the second operational amplifier circuitry and subsequent electronic stages of the system by a first optic coupler in the forward loop between the two operational amplifiers and a second optic coupler in the feedback loop between the two operational amplifiers.

The operational amplifiers may be coupled to the light emitters of the associated optic couplers by current amplifiers, if desired.

The resultant circuit is capable of directly isolating DC and AC and amplifying the same with the superior operating characteristic typical of a simple directly connected operational amplifier. Thus direct transmission of DC as well as AC signals is accomplished with DC drift and gain performance improved by negative feedback by the utilization of the two optic couplers with total DC and AC isolation for the patient against electrical hazards.

DESCRIPTION OF THE DRAWING

The drawing is a schematic diagram of a preferred embodiment of a bio-isolated DC operational amplifier circuit of the present invention.

DESCRIPTION OF THE PREFERRED EMBODIMENT

Referring now to the drawing, the incoming bio-signal is applied to one input 11 of a first integrated circuit operational amplifier 12 via resistor R1, the other input 13 of the amplifier 12 being coupled via resistor R2 to ground G1, the patient ground which is isolated from the main current ground G2. The output of amplifier 12 is coupled to the base of transistor Q1 which serves as a current amplifier to transmit current via its emitter to the light-emitting diode 14 of a first optic coupler 15, the transistor Q1 being coupled in series with diode 14 and resistor R3. The gain of amplifier 12 is determined by the ratio of the values of resistor R1 and resistor R4 in the feedback from the emitter of Q1 to the inverting input of the operational amplifier 12. Capacitor C1 provides frequency stability and sets the low-pass frequency response for amplifier 12 and for the bio-isolated DC operational amplifier.

The DC or analog signals are coupled through the integrated circuit optic coupler 15 comprising the emitting diode 14 and the detector circuit comprising phototransistor Q2 and/or associated amplifier transistor Q3. The optic coupler 15 provides isolation resistance of the order of $10^{11}$ ohms and coupling capacitance of 1.5 picofarad or less. The output of Q3 is coupled to the non-inverting input of the integrated circuit operational amplifier 16 which produces the desired output to the subsequent utilization circuits. The gain of operational amplifier 16 is set by the ratio of resistors R5 and R6. Capacitor C2 determines its frequency response and stability.

The output of amplifier 16 is coupled in a feedback loop to the input 11 of amplifier 12 comprising a current amplifier Q4 and a second optic coupler 17. The current amplifier Q4 drives the light-emitting diode 18 of integrated circuit coupler 17, the phototransistor Q5 and amplifier transistor Q6 transmitting the DC and AC feedback signals to amplifier 12 via feedback resistor R7 which determines the gain.

Resistors R8 and R9 provide DC bias to the detector of optic coupler 17 to zero DC balance the operational amplifier 12 output to prevent signal distortion. Resistors R10 and R11 perform a similar function for optic coupler 15 and operational amplifier 16.

Batteries BT1 and BT2 supply power to the electronics left of dividing line A—A' and batteries BT3 and BT4 supply power to the electronics on the right side.

Current amplifiers Q1 and Q4 are not required for current amplification if the integrated operational amplifiers 12 or 16 have high output current capability or the optic couplers utilized are sufficiently efficient in conversion and transmission of light.

I claim:

1. An amplifier circuit for electrically isolating an input signal from an output signal which is an amplified version of the input signal comprising
    a first operational amplifier having an input and an output,
    a signal input terminal coupled to said amplifier input,
    a first light emitter, and a first photodetector capable of generating a signal when energized, said first light emitter being optically coupled to said first photodetector and electrically coupled to said output of said first operational amplifier,
    a second operational amplifier having an input and an output, said output signal being generated at said output of said second operational amplifier, said input of said second operational amplifier being coupled to said first photodetector,
    a negative voltage feedback circuit for coupling the output of said second operational amplifier to the input of said first operational amplifier, said feedback circuit comprising a second light emitter, a second photodetector capable of generating a signal when energized, and a resistor, said second light emitter being optically coupled to said second photodetector and electrically coupled to said output of said second operational amplifier, said resistor being connected between said photodetector and said input of said first operational amplifier, said feedback circuit applying a signal to said input of said first operational amplifier which is always of opposite polarity to the signal at said signal input terminal,
    a first power supply coupled to said first operational amplifier, said first light emitter and said second photodetector,
    a second power supply coupled to said first photodetector, said second operational amplifier and said second light emitter, said first power supply being electrically isolated from said second power supply and said signal input terminal being electrically isolated from said output of said second operational amplifier.

2. A circuit as claimed in claim 1 comprising a first current amplifier coupled between the output of said first operational amplifier and said first light emitter and a second current amplifier coupled between the output of said second operational amplifier and said second light emitter.

3. A circuit as claimed in claim 2 wherein each of said current amplifiers includes a transistor having a base coupled to the output of the associated operational amplifier and a collector-emitter circuit coupled to the associated light emitter.

4. A circuit as claimed in claim 1 wherein each of said photodetectors comprises a phototransistor.

5. A circuit as claimed in claim 4 wherein each photodetector further includes a transistor amplifier coupled to said phototransistor.

* * * * *